Patented Apr. 20, 1926.

1,581,258

UNITED STATES PATENT OFFICE.

HAROLD F. WHITTAKER, OF CARNEYS POINT, NEW JERSEY, AND WALTER WOLLASTON, OF WILMINGTON, DELAWARE, ASSIGNORS TO E. I. DU PONT DE NEMOURS & COMPANY, OF WILMINGTON, DELAWARE, A CORPORATION OF DELAWARE.

PURIFICATION OF ALPHA-NITRO-NAPHTHALENE.

No Drawing. Application filed July 1, 1920. Serial No. 393,372.

*To all whom it may concern:*

Be it known that we, HAROLD F. WHITTAKER and WALTER WOLLASTON, citizens of the United States, and residents of Carneys Point, New Jersey, and Wilmington, Delaware, respectively, have invented a certain new and useful Purification of Alpha-Nitro-Naphthalene, of which the following is a specification.

This invention relates to the purification of alpha-nitro-naphthalene, and comprises dissolving said substance in, and crystallizing it from, a solvent under carefully controlled conditions.

The chief object of our invention is to provide an inexpensive purification process whereby high yields of alpha-nitro-naphthalene of a high degree of purity may be obtained.

It has heretofore been proposed to purify crude alpha-nitro-naphthalene, resulting from the nitration of naphthalene with mixed nitric and sulphuric acids, by dissolving the crude product in solvent naphtha and then cooling to cause crystallization of alpha-nitro-naphthalene. The low yields and impurity of the crystals has prevented the adoption of this process on a commercial scale. Upon further investigation of this process we have found the reasons for the poor results heretofore obtained, and have discovered what changes are necessary to make this purification process successful.

According to the former mode of procedure, the quantity of solvent employed was much too large, the cooling was done in such a way that the crystals were too large thereby resulting in the occlusion of substantial quantities of oil that could not be readily removed from the crystal surfaces, and the removal of the solvent retained by the crystal surfaces was sought to be accomplished by pressing.

The conditions which we have found to be effective in giving high yields are, (1) the use of small quantities of solvent, for example from 5 to 25%, and preferably about 10%, based on the weight of the crude nitro-naphthalene; (2) the production of very fine crystals by carrying on the cooling and crystallization with constant agitation, and the removal from the crystals of the solvent containing the impurities by centrifugal action.

In order to effectively use the small proportion of solvent above mentioned, it becomes necessary to melt the crude nitro-naphthalene to enable it to form a homogeneous mixture with the solvent. This is done for instance by heating crude nitro-napthalene and solvent naphtha to about 50° C.

Many of the ordinary solvents other than solvent naphtha may be used in the present process, since above its melting point (50-55° C.) crude nitro-naphthalene is miscible in all proportions with most organic solvents. Of the other solvents well suited for our purpose there may be mentioned petroleum ether, benzene, toluene, and turpentine. In general any organic solvent distilling below 200° C. may be used.

Our new process may be illustrated by the following example:—

100 parts of crude alpha-nitro-naphthalene are mixed with 10 parts by weight of solvent naphtha, and the mixture heated to a temperature slightly above 50° C. until a homogeneous mixture is formed. The resulting solution is cooled to 25° C. with constant agitation in order that the crystals formed may be as small as possible. As a result of this treatment there is formed a thick mush which is subjected to centrifugal action in a centrifuge to separate the liquid from the crystals. The alpha-nitro-naphthalene obtained in this manner has a solidifying point not lower than 54.4° C.

Where a greater amount of solvent than in the above example is used, say 15 or 20% instead of 10%, the temperature to which the solution is cooled should preferably be below 25° C. in order to obtain a high yield of crystals. On the other hand the temperature to which the solution is cooled should not be so low as to interfere with the separation of the solvent and the impurities by centrifugal action.

Instead of heating the mixture of nitro-naphthalene and solvent to 50° C. it will of course be evident that the solvent may be mixed directly with molten nitro-naphthalene to form a homogeneous mixture. The proportion of solvent used should preferably be such that the resulting solution will be saturated with alpha-nitro-naphthalene at some point between 40 and 50° C. If the proportion of solvent is such that the saturation point occurs below 40° C., the yield of alpha-nitro-naphthalene will be reduced.

While we have described our invention in detail, we wish it to be understood that various changes may be made therein without departing from the spirit of said invention.

We claim:—

1. The process of purifying crude alpha-nitro-naphthalene which comprises forming a solution of said crude alpha-nitro-naphthalene in about 10% of a solvent, based on the weight of said nitro-naphthalene, at a temperature of from about 50 to 55° C., cooling the solution with agitation to cause the alpha-nitro-naphthalene to form minute crystals, and separating the latter from the mother liquor.

2. The process of purifying crude alpha-nitro-naphthalene which comprises forming a solution of said nitro-naphthalene at a temperature above 50° C. in about 10% of solvent naphtha, cooling said solution with constant agitation to a temperature below 26° C., and separating the mother liquor from the resulting crystals.

3. The process of purifying crude alpha-nitro-naphthalene which comprises forming a solution of said nitro-naphthalene at a temperature of from about 50 to 55° C. in about 10% of solvent naphtha, cooling said solution with constant agitation to a temperature below 26° C., and separating the mother liquor from the resulting crystals by centrifugal action.

In testimony whereof we affix our signatures.

HAROLD F. WHITTAKER.
WALTER WOLLASTON.